United States Patent Office 2,953,221
Patented Sept. 20, 1960

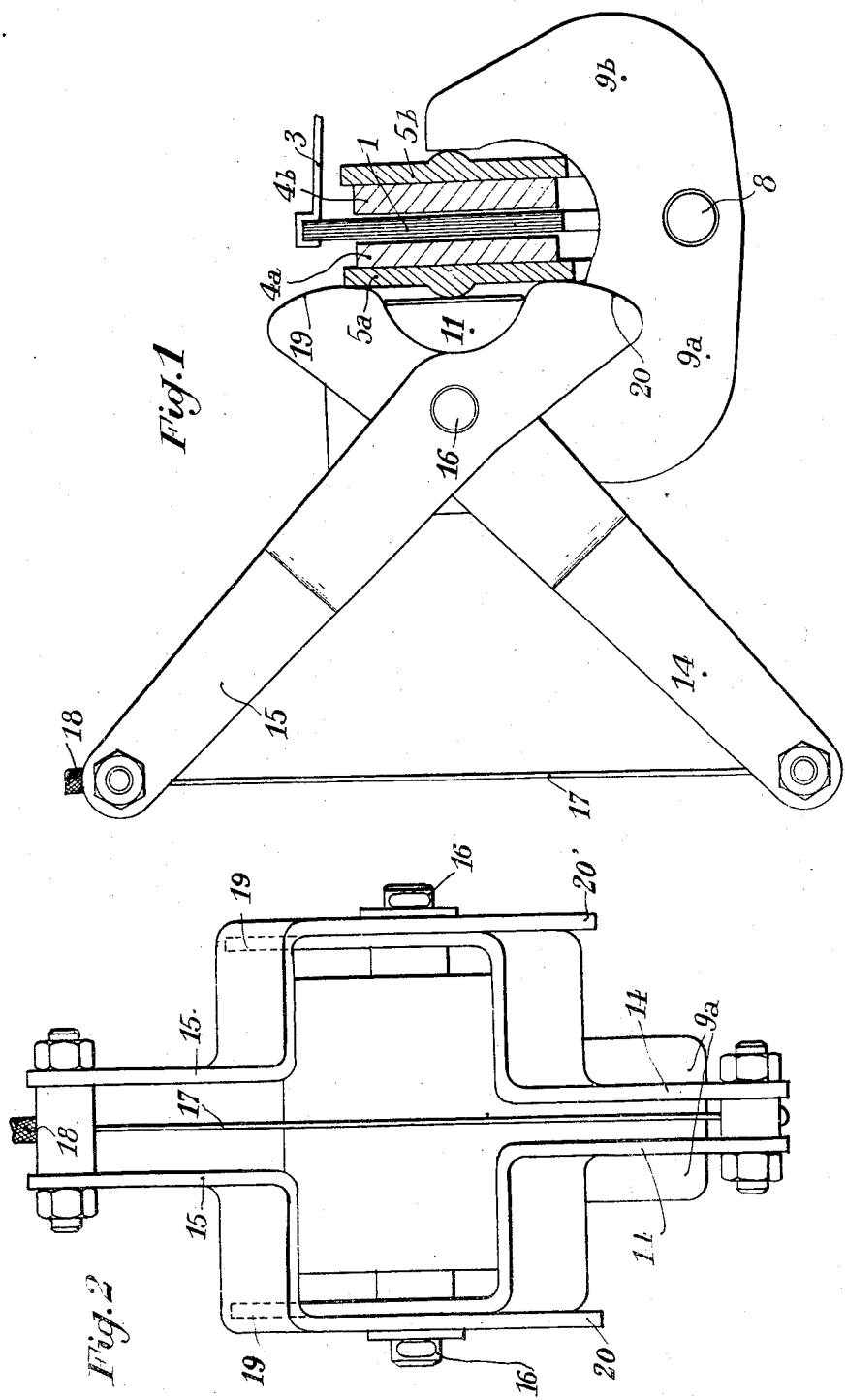

2,953,221

DISC BRAKES FOR THE WHEELS OF VEHICLES

Rene Lucien, Neuilly-sur-Seine, France, assignor to Societe a responsabilite limitee: Recherches Etudes Production R.E.P., Paris, France, a company of France Filed Feb. 12, 1957, Ser. No. 639,682

Claims priority, application France Oct. 1, 1956

1 Claim. (Cl. 188—73)

This invention relates to disc brakes for the wheels of vehicles, and particularly to disc brakes of the type comprising a brake-frame which can oscillate about a spindle which is secured to the stationary part of the brake, the said brake-frame being formed by a two-armed clamping member such as a stirrup-shaped part which carries in one of its sides a hydraulic jack. The action of braking results from the clamping of the brake-disc between two brake-blocks which are actuated respectively by the piston of the jack and by the other side of the oscillatably-mounted clamping brake-frame.

The present invention relates to a brake of this type of which comprises in addition a mechanical auxiliary of parking control which ensures the direct clamping of the brake-blocks without the jack being put into operation.

This mechanical control may be formed by a unit of two scissors-levers which are pivoted on one of the sides of the oscillatable brake-frame, are controlled by the driver of the vehicle by means of a flexible Bowden cable connecting together one end of each lever to enable them to be drawn together and which with their other ends thrust against the brake-block belonging to the one side of the frame, while by reaction, the other side thrusts the other brake-block against the disc.

The attached drawing shows by way of example one embodiment of a brake in accordance with the invention:

Figure 1 is a view in axial section of one side of the brake with the brake body shown in elevation;

Figure 2 is an end elevation looking from the left as viewed in Figure 1;

Figure 3:
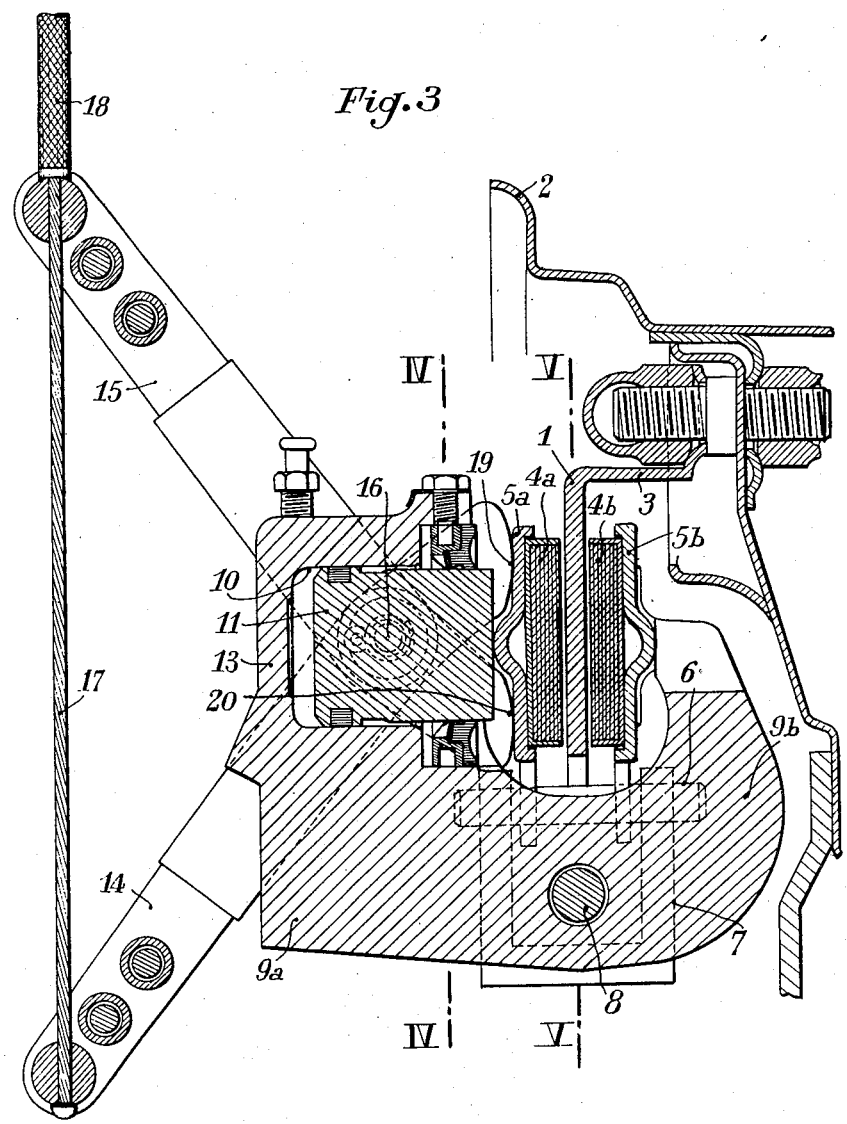
Figure 3 is a section view through the brake-body in the plane of the shaft of the wheel.
Figure 4:
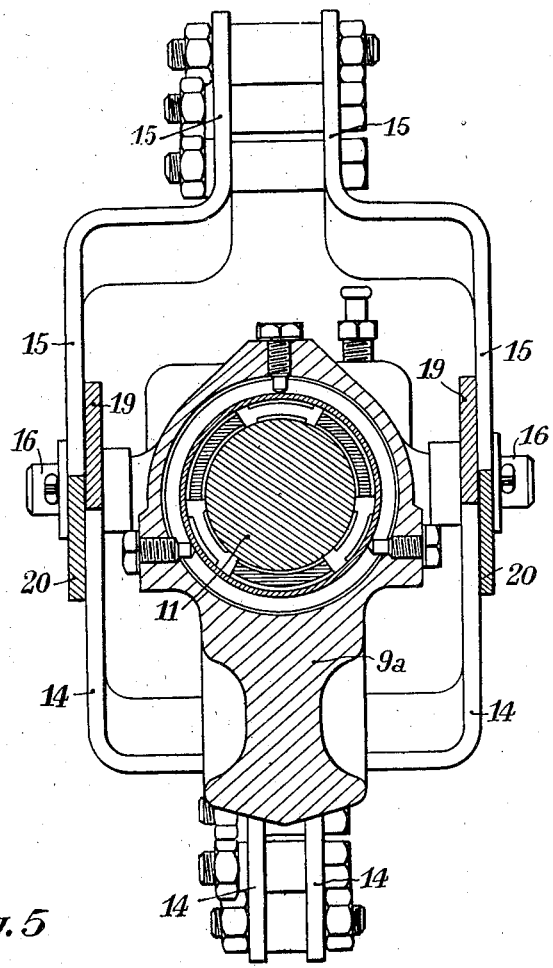
Figure 4 is a section on the line IV—IV of Figure 3.
Figure 5:
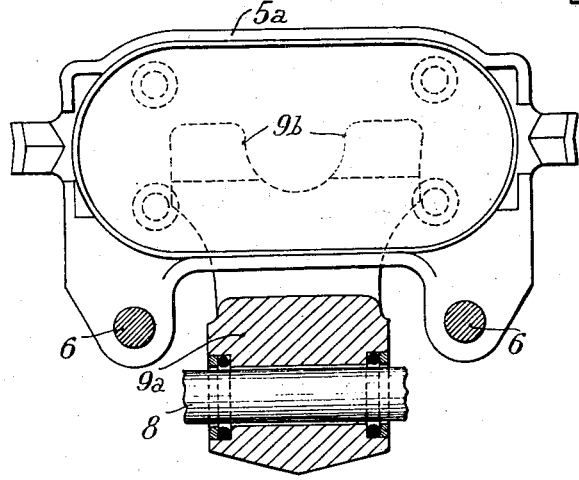
Figure 5 is a section on the line V—V of Figure 3.

Referring to Figures 1 to 5, a brake-disc 1 (Figure 3) is attached to a rim 2 of a wheel—and not to its hub by means of a bracket 3. This disc, which is thus secured for rotation to the wheel, can be gripped between the two brake-blocks 4a, 4b, carried respectively by brake members 5a—5b, formed of sheet metal and which can slide parallel to the shaft of the wheel on rods 6, carried by a support 7 fixed with respect to the vehicle.

There oscillates about a spindle 8 of the support 7 a stirrup-shaped brake-frame 9a—9b, of which the side 9a is provided with a hydraulic cylinder bore 10, in which there is movable a piston 11, abutting upon the brake-member 5a, while the side 9b of the stirrup forms a jaw which abuts upon the other brake member 5b.

When the fluid under pressure is sent into the space 12, the piston 11 is pushed towards the right (Figure 3) and presses the member 5a, with its friction packing 4a against the disc 1, while, by reaction, the head 13 of the cylinder is pushed towards the left, thus causing the pivoting of the stirrup 9a—9b about the spindle 8, so that the end of the side 9b presses the member 5b with its packing 4b against the disc 1. This latter is thus gripped between the sides of the stirrup-shaped brake-frame, or, more precisely, between the friction packings 4a—4b.

In accordance with the present invention this disc brake is provided with a parking control, which is formed by two forked levers 14 and 15 pivoted together at 16, the pivot being carried by the side 9a of the stirrup.

Towards the end of the larger arm of the lever 14 there is fixed a cable 17, of which the sheath 18 is connected to the end of the larger arm of the lever 15.

At the opposite ends, the two levers are each terminated by cams respectively 19—19 and 20—20.

The operation of this auxiliary mechanical control is easily understood:

The driver, on actuating the cable 17, causes the two forked levers 14, 15 to approach one another by pivoting about the spindle 16. The cams 19—20 thrust the member 5a with its packing 4a against the disc 1, while, by reaction on the spindle 16, the pivoted frame 9a, 9b tilts slightly about the spindle 8, so that the end of the arm 9b presses the member 5b with its brake block 4b against the brake-disc 1.

This mechanical control by means of the pair of forked levers is therefore entirely independent of the hydraulic operation. It is to be noted that the effort exerted by the four cams 19—19 and 20—20 during the action of braking only requires a low effort, while ensuring a strong grip on the brake disc.

Supplementary points of attachment 21—22 and 23—24 are provided, on the forked levers, for the cable and the sheath in order that wear on the brake blocks may be compensated, without the amplitude of the effort of control exerted by the driver being increased.

The invention applies to all brakes of the type comprising at least two-armed brake-frames pivoted on a spindle and in particular to brakes of this type, which comprise two such pivoted frames.

Figure 6:
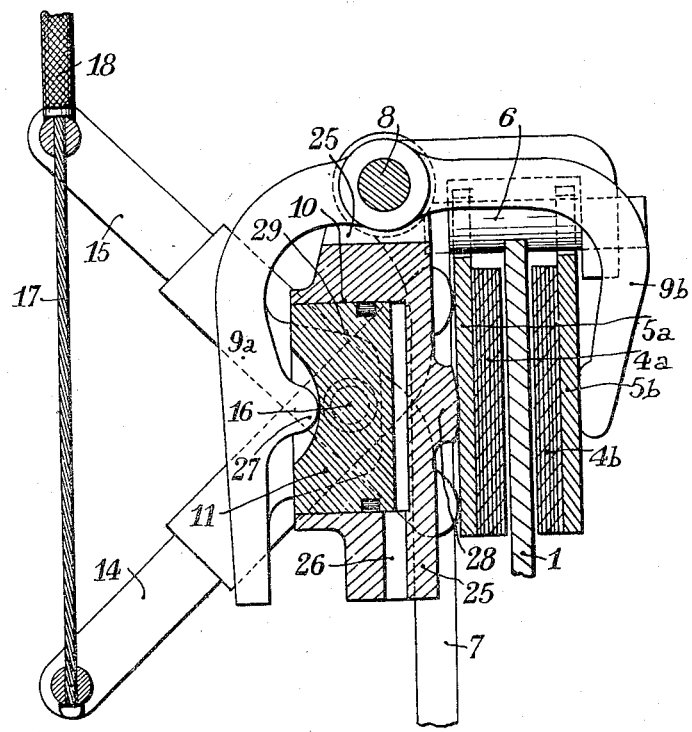
Figure 6 is a view similar to Figure 3 of an alternative embodiment.

Another embodiment is shown in Figure 6, in which the parts already shown in Figures 1–5 have the same reference symbols.

In this embodiment, the brake proper has the following two differences, compared with the brake shown in the previous drawings:

Firstly, the brake disc 1 is not attached to the rim of the wheel, but to the hub (not shown) of same so that the stirrup-shaped part 9a—9b, oscillating about the spindle 8, is reversed, that is to say, that it has its opening towards the hub and no longer towards the rim. Secondly, the bore 10—in which the piston 11 of the hydraulic drive moves—is no longer in the stirrup-shaped frame, but in a supplementary part 25, capable of oscillating about the same spindle 8, as the stirrup.

In hydraulic operation, when the fluid under pressure is admitted into the conduit 26, the piston 11 exerts a pressure on the shoulder 27 of the arm 9a of the stirrup, so that by pivoting of the stirrup about the spindle 8, the arm 9b presses the brake member 5b, at the same time as the boss 28 of the part 25 pivots on the same spindle, and rests on the brake member 5a.

Auxiliary mechanical control by cable is effected, as in the previous embodiment, by the action of forked levers 14—15 connected to the spindle 16 which is itself carried by two lateral cheeks 29 on the arm 9a of the stirrup.

I claim:

A mechanical control for a brake system employing a disc sandwiched by two friction lining members and including a pivotally mounted frame engaging one of the members; said control comprising a lever, a shaft fixedly positioned with respect to said frame and coupled to said frame so as to be capable of transmitting forces thereto, said shaft pivotally supporting said lever adjacent the other of said members, control means coupled to said lever for pivoting the same to urge said other member against the disc, the frame being pivoted by reaction forces received via said shaft to urge said one member against the disc, and a second lever adjacent said other member and pivotally mounted on said shaft in intersecting relation with the first said lever, said control means further engaging said second lever for pivotal displacement thereof to displace said other member, said means comprising a sheath coupled to one of said levers and a cable coupled to the other of said levers, said sheath housing said cable for relative motion therebetween to pivot the levers.

References Cited in the file of this patent

UNITED STATES PATENTS

| | | | |
|---|---|---|---|
| 1,186,671 | McKenzie | June 13, | 1916 |
| 2,144,019 | Goepfrich | Jan. 17, | 1939 |
| 2,575,578 | Bricker | Nov. 20, | 1951 |
| 2,655,229 | Eksergian | Oct. 13, | 1953 |
| 2,689,024 | Trevaskis | Sept. 14, | 1954 |
| 2,781,106 | Lucien | Feb. 12, | 1957 |
| 2,862,581 | Lucien | Dec. 2, | 1958 |

FOREIGN PATENTS

| | | | |
|---|---|---|---|
| 898,474 | France | Apr. 24, | 1945 |
| 700,579 | Great Britain | Dec. 2, | 1953 |
| 728,376 | Great Britain | Apr. 20, | 1955 |